(12) United States Patent
Niggemann

(10) Patent No.: US 6,490,512 B1
(45) Date of Patent: Dec. 3, 2002

(54) DIAGNOSTIC SYSTEM FOR AN LED LAMP FOR A MOTOR VEHICLE

(75) Inventor: Detlef Niggemann, Bueren-Steinhausen (DE)

(73) Assignee: Hella KG Hueck & Co., Lippstadt (DE)

(*) Notice: Subject to any disclaimer, the term of this patent is extended or adjusted under 35 U.S.C. 154(b) by 0 days.

(21) Appl. No.: 09/434,499

(22) Filed: Nov. 5, 1999

(30) Foreign Application Priority Data

Nov. 13, 1998 (DE) .......................... 198 52 351

(51) Int. Cl.⁷ .............................................. G06F 19/00
(52) U.S. Cl. .............................. 701/29; 701/30; 701/34; 340/458
(58) Field of Search ................. 701/29, 30, 31, 701/32, 34; 340/438, 458; 315/76, 77

(56) References Cited

U.S. PATENT DOCUMENTS 5,574,423 A * 11/1996 Vosika et al. ................ 340/332
6,111,514 A * 8/2000 Cossins et al. .............. 340/654
6,132,072 A * 10/2000 Turnbull et al. ............. 362/230

FOREIGN PATENT DOCUMENTS

| DE | 26 05 114 C2 | 8/1977 |
|---|---|---|
| DE | 27 56 750 A1 | 6/1979 |
| DE | 36 16 506 A1 | 11/1987 |
| DE | 37 24 916 A1 | 2/1989 |
| DE | 43 39 128 A1 | 5/1994 |
| DE | 43 41 058 | 4/1995 |
| DE | 44 46 197 C1 | 8/1996 |

* cited by examiner

Primary Examiner—Tan Nguyen
(74) Attorney, Agent, or Firm—Birch, Stewart, Kolasch & Birch, LLP

(57) ABSTRACT

A diagnostic system of an LED lamp system for a motor vehicle has a light control module for controlling an LED lamp via a supply wire and in case of malfunction, the LED lamp sends a diagnostic signal via the supply wire to the light control module. Additionally, the LED lamp, in case of malfunction, modulates a received current with a switchable current sink, whereby the light control module receives coded diagnostic information via the supply wire.

6 Claims, 1 Drawing Sheet

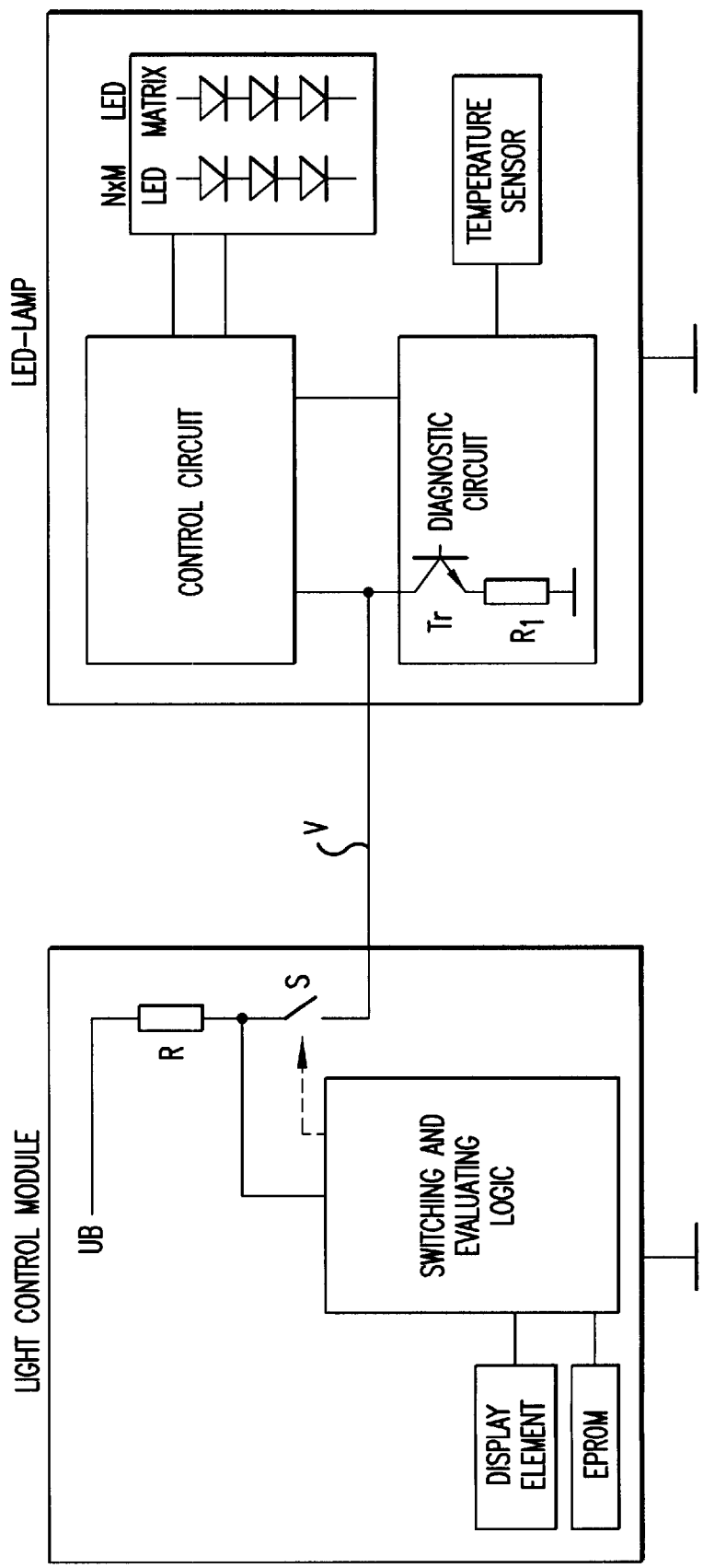

DIAGNOSTIC SYSTEM FOR AN LED LAMP FOR A MOTOR VEHICLE

BACKGROUND OF THE INVENTION

This invention relates to a diagnostic system of an LED lamp system in a motor vehicle of a type having a light control module that connects an LED lamp to an operating voltage source and monitors a current consumption of the LED lamp, with the LED lamp having an LED matrix comprising a plurality of interconnected LEDs, a control circuit for controlling and monitoring the LEDs, and a diagnostic circuit that generates an error signal in case of malfunction.

Lighting equipment, in an increasing number of vehicles, is switched via a light control module. German patent document (DE 43 41 058 C1) discloses a light control apparatus for a motor vehicle, but this example shows that such a device can be structured to be very complex. In this example, both a light control module and a lamp module are structured as "smart" components, i.e. equipped with a microcomputer, making such a light control apparatus quite expensive. Especially in the field of motor vehicles, however, for reasons of cost, particularly-uncomplicated structured embodiments of light control devices are preferred.

Usually, a light control module has a device for monitoring current that, for example, indicates to a vehicle driver, in a case of controlled filament lamps, whether a filament lamp must be changed. This is problematic when the controlled lamps in motor vehicles are LED-based lamps which, because of their rate of response, reliability, and design possibilities, are increasingly replacing filament lamps. In order to meet light values required by law, it is necessary to control, or drive, several LEDs simultaneously. In a known manner, serial and parallel connections are used. Control occurs via the light control module, which monitors current consumption of the lamp for short circuits and open circuits. This results in the following problem: when using an LED lamp, the light control module cannot recognize a failure of one individual LED (or LED row) by monitoring current consumption because of relevant tolerances and, where applicable, because of double usages of individual LEDs in different light functions. However, within the lamp, such a diagnostic procedure is possible at low cost.

To provide this diagnostic data to the light control module, it is possible to provide a diagnostic output at the LED lamp that is conveyed to the light control module via a diagnostic wire. Such an arrangement, however, proves to be quite costly.

The wiring cost for an additional diagnostic wire for each LED lamp entails additional expenses; which is also the case for components for issuing the diagnostic signals (output driver, perhaps even a microprocessor) within the LED lamp, with these additional expenses accruing even if the diagnostic capability is not even used in a vehicle.

It is therefore an object of this invention to provide a diagnostic system for an LED lamp in a motor vehicle that is particularly uncomplicated and inexpensive in construction.

SUMMARY OF THE INVENTION

According to principles of the invention, in case of malfunction, a diagnostic circuit modulates current consumption of an LED lamp via a switchable current sink depending on a type of malfunction that has occurred, and a light control module converts the modulated current into a voltage signal, with the type of malfunction that has occurred being recognized from the voltage signal.

Thus, advantageously, the diagnostic system according to the invention does not require its own diagnostic wire, since the diagnostic information occurs through current modulation on a supply wire of the LED lamp.

Additionally, the cost of components for generating, transmitting, and evaluating the diagnostic information in the LED lamp and in the light control module is exceptionally low. Special inputs and outputs are no longer required for the diagnostic information.

Additional advantageous embodiments and further enhancements of the diagnostic system are possible within this invention.

BRIEF DESCRIPTION OF THE DRAWING

The invention is described and explained in more detail below using an embodiment shown in the drawing. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawing. The drawing is not necessarily to scale, emphasis instead being placed upon illustrating principles of the invention in a clear manner.

The single FIGURE is a schematic and block diagram of a diagnostic device according to the invention.

DESCRIPTION OF THE PREFERRED EMBODIMENT

In FIG. 1 an LED lamp and a light control module are each shown as a block circuit diagram.

The LED lamp has an LED matrix comprising M parallel LED rows, each comprising N LEDs connected in series (M, N≧1).

The LED matrix is controlled as well as monitored by a control circuit, with the control circuit being able to also detect a failure of an individual LED (or LED row), and in such case completely switch off the LED matrix.

A diagnostic circuit is connected to the control circuit and to a temperature sensor, and, in case of malfunction, signals the type of malfunction that has occurred to a light control module in a manner according to the invention.

The light control module is connected by of a supply wire (V) to the LED lamp, and connects the supply wire V via a controllable switch (S) and a very low impedance resistor (R) to an operating voltage source (UB) for the LED lamp. By evaluating the voltage drop at the resistor (R), a switching and evaluation logic can detect an interruption or a ground fault of the supply wire (V); however, additional diagnostic capabilities regarding internal malfunctions of the LED lamp are not possible.

Such internal malfunctions may be, specifically:

failure of an LED/LED row failure of several LEDs/LED rows excessive temperature.

The concept of the invention is to modulate current consumption depending on a type of malfunction that has led to an internal switching off of the LED lamp, so that the light control module can evaluate the malfunction, store it, for example, in a non-volatile memory (EEPROM), and display it to a vehicle driver on a display element. The diagnostic operating state is activated by an error signal that occurs if the control circuit switches the LED matrix off or the temperature sensor generates a signal indicating excessive temperature.

A modulation of a consumption current in case of malfunction is realized through a switched current sink (Tr, $R_1$). This modulated current is converted into a readable voltage signal in the light control module by the pull-up resistor (R). A low-frequency pulse width modulation is advantageously used as the modulation method.

The manner in which the inventive diagnostic system functions is explained below.

The LED lamp is connected to the light control module via the supply wire (V) and is switched on by this via the controllable switch (S). In case of malfunction, when the LED lamp is turned off and operation of a voltage converter of the LED lamp has been stopped, the diagnostic circuit is activated.

The diagnostic circuit of the LED lamp then modulates, depending on the type of malfunction that has occurred, current consumption of (or current received by) the LED lamp in the form of a pulse width modulated signal on the supply wire (V). By allocating a specific frequency to each possible malfunction, a simple coding of the malfunctions can be achieved, whereby it is of particular advantage for the diagnostic signal to be a rectangular signal having a defined pulse width. In this case, the switching and evaluation logic can decode diagnostic information from a frequency as well as an average value of the signal voltage.

At this point, the light control apparatus detects that the operating current of the LED lamp has fallen below a predetermined value, receives the diagnostic signal, and evaluates it. It also stores the malfunction in a non-volatile memory (EEPROM), and displays the malfunction on the display element.

The switching and evaluation logic can, therefore, distinguish between various malfunctions, report them to the driver, and store them.

In further embodiments of the invention, a malfunction reaction can be implemented depending on the type of malfunction that has occurred or the information received: a dimmed brake light in reaction to the failure of the taillight, switching off or dimming as a reaction to excessive temperature, or a simple notice about a reduced function.

Thus, a modulated spaced-pulse current can advantageously be converted, via a resistor connected in the supply wire, into a voltage signal that is detected at an input of the switching and evaluation logic, and is evaluated by the switching and evaluation logic as to the type of malfunction that has occurred.

It is advantageous for the diagnostic signal to be a rectangular frequency signal having a defined pulse width. By allocating a specific frequency to each possible malfunction, a simple coding of the malfunctions can be achieved. The diagnostic information can be decoded, therefore, both from the frequency and from the average, or mean, value of the signal voltage.

It is also advantageous that such a malfunction-dependent modulation is also realized in an LED lamp "without a smart feature", i. e. without its own microcomputer, because the LED lamp can be produced at a particularly low cost. A microcomputer must be provided only for the switching and evaluation logic of the light control module.

It is also advantageous to display to the driver the malfunction that has occurred in a display element, or unit, and, moreover, to store it for subsequent error analysis in a non-volatile memory (EEPROM).

In addition to the failure of one or more LEDs, the occurrence of excessive temperatures within the LED lamp can also be provided as a detectable malfunction. It is advantageous, therefore, to provide the temperature sensor in the LED lamp.

The invention claimed is:

1. A diagnostic system of an LED-lamp for a motor vehicle comprising:

the LED lamp including an LED matrix having a plurality of LEDs connected in a circuit, a control circuit for controlling and monitoring the LEDs of the matrix, and a diagnostic circuit connected to the control circuit for generating an error signal in case of malfunction;

a light control module for connecting the LED lamp to an operating voltage source (UB) and monitoring a current consumption of the LED lamp;

wherein, in case of malfunction of the LED lamp, the diagnostic circuit is for modulating in different manners the current consumption of the LED lamp by using a switchable current sink (Tr, R1), each manner of modulation depending on a type of malfunction that has occurred, and wherein the light control module is for converting the modulated current consumption into voltage signals and for recognizing the types of malfunctions that have occurred from the voltage signals.

2. The diagnostic system as in claim 1, wherein the light control module connects the LED lamp through a resistor (R) to the operating voltage source (UB) and wherein the light control module evaluates the voltage signal at that resistor (R) for recognizing the types of malfunctions that have occurred .

3. The diagnostic system as in claim 1, wherein the LED lamp has a temperature sensor and wherein the diagnostic circuit generates an error signal signaling an excessive temperature if an output value of the temperature sensor is above a predetermined limit.

4. The diagnostic system as in claim 1, wherein the light control module stores a detected malfunction in a non-volatile memory (EEPROM).

5. The diagnostic system as in claim 1, wherein the light control module displays the detected malfunctions on a display unit.

6. The diagnostic system as in claim 1, wherein the diagnostic circuit encodes the type of malfunction that has occurred as a rectangular signal having a defined pulse width.

* * * * *